Oct. 17, 1967  C. N. KIMBERLIN, JR., ET AL  3,347,625
DEHYDRATION OF MAGNESIUM CHLORIDE
Filed March 18, 1965
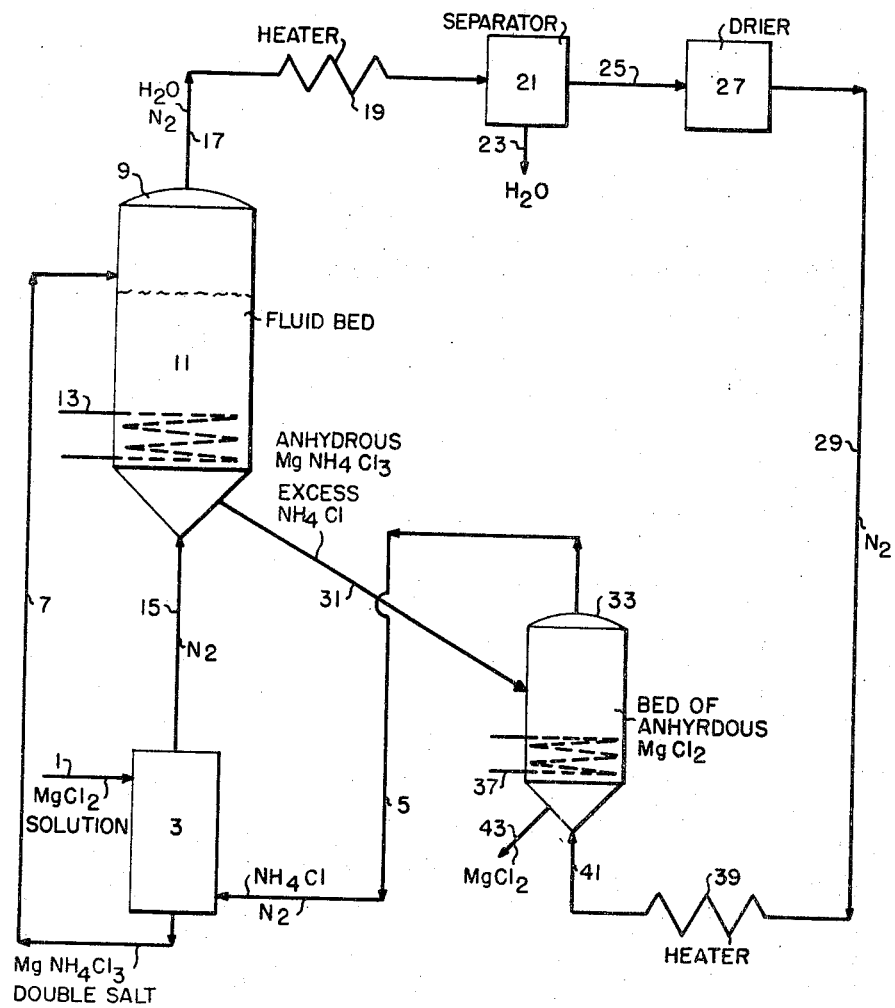
Charles Newton Kimberlin, Jr.
William Floyd Arey, Jr.  Inventors
Fred J. Buchmann
By W. O. Heilman
Patent Attorney 3,347,625
DEHYDRATION OF MAGNESIUM CHLORIDE
Charles Newton Kimberlin, Jr., William Floyd Arey, Jr., and Fred J. Buchmann, Baton Rouge, La., assignors to Esso Research and Engineering Company, a corporation of Delaware
Filed Mar. 18, 1965, Ser. No. 440,689
8 Claims. (Cl. 23—91)

ABSTRACT OF THE DISCLOSURE

The present invention covers an integrated, three-stage process for the production of anhydrous magnesium chloride. In a first stage an aqueous solution of magnesium chloride is countercurrently contacted with an upflowing stream of ammonium chloride and an inert gas. The inert gas is introduced into the bottom of a secondary stage and utilized as a fluidizing gas. An aqueous solution of magnesium/ammonium chloride is withdrawn from the first stage and introduced into the upper area of the second stage containing fluidized particles of magnesium/ammonium chloride and an excess of ammonium chloride. Temperatures are such that the water and fluidizing gas is removed overhead while anhydrous magnesium/ammonium chloride is removed from the lower area of the secondary stage. This stream is introduced into a tertiary stage which is maintained under conditions to remove overhead ammonium chloride and to remove from the lower area of the secondary stage anhydrous magnesium chloride. The tertiary stage is a fluid bed in which the fluidizing gas is the inert gas removed from said secondary stage after the same has been dried.

---

The present invention is broadly concerned with the dehydration of magnesium chloride so as to produce anhydrous magnesium chloride. The invention is specifically concerned with the dehydration of magnesium chloride by the use of an integrated process which comprises in essence two fluid beds and a scrubber whereby anhydrous magnesium chloride is produced without the formation of undesirable hydrolysis products such as magnesium hydroxy chloride (MgOHCl), magnesium oxide and hydrochloric acid.

It is known in the art that naturally occurring magnesium chloride generally contains associated therewith six molecules of water ($MgCl_2 \cdot 6H_2O$). It is also known in the art that by general dehydration processes it is possible to remove about four molecules of water without securing undesirable side reactions. However, if further dehydration is continued by known techniques to remove the remaining two molecules of water, undesirable side reactions occur such as the formation of magnesium hydroxy chloride, magnesium oxide and hydrochloride acid.

It has now been discovered that if an integrated process comprising two fluid beds be used in conjunction with a scrubber and in conjunction with ammonium chloride and an inert gas, unexpected desirable results will be secured. The process of the present invention may be fully understood by reference to the flow plan illustrating one embodiment of the same.

Referring specifically to the drawing, an aqueous solution of hydrated magnesium chloride in a concentration of about 20 to 50% by weight of magnesium chloride, preferably about 30% by weight of magnesium chloride is introduced into scrubbing zone 3 by means of line 1. This solution flows downwardly in zone 3 and countercurrently contacts an up-flowing gaseous mixture comprising ammonium chloride and an inert gas such as nitrogen. This gaseous mixture is introduced at the lower end of zone 3 by means of line 5. The temperature maintained in scrubber 3 is in the range from 160° F. to 260° F., preferably about 220° F. The pressure in zone 3 is in the range from about 5 lbs. per square inch to 30 lbs. per square inch, preferably about 15 lbs. per square inch. The amount of ammonium chloride introduced by means of line 5 as compared to the amount of magnesium chloride introduced by line 1 is in the range from about 1.0 to 1.5 moles of ammonium chloride per mole of magnesium chloride, preferably about 1.1 moles of ammonium chloride as compared to 1 mole of magnesium chloride.

Under these conditions nitrogen is removed overhead from zone 3 by means of line 15 while ammonium chloride is scrubbed out of the gas in zone 3 by the solution of magnesium chloride. The ammonium chloride combines with the magnesium chloride to form a solution of a hydrated double salt magnesium/ammonium chloride $$(MgNH_4Cl_3)$$

This solution of the double salt of magnesium/ammonium chloride is withdrawn from the bottom of zone 3 by means of line 7 and introduced into reaction zone or vessel 9 where it is sprayed into and/or onto a fluid bed 11 which comprises anhydrous magnesium/ammonium chloride and an excess of ammonium chloride. The fluid bed is maintained by conventional means using the inert gas such as nitrogen as a fluidizing medium. The amount of magnesium/ammonium chloride present in the bed as compared to the amount of ammonium chloride maintained in fluid bed 11 is in the range from about 80 to 100 weight percent of magnesium/ammonium chloride compared to 20 to 0 weight percent of ammonium chloride. The temperature of reaction zone 9 is maintained at about 375° F. to 480° F., preferably about 420° F. by means of heater coils or equivalent means 13. As pointed out, the nitrogen from zone 3 enters reaction vessel 9 by means of line 15. The pressure maintained at the top of secondary reaction zone 9 is about atmospheric pressure.

When the hydrated magnesium/ammonium chloride is sprayed into the hot anhydrous particles of magnesium/ammonium chloride and excess ammonium chloride, it is immediately dehydrated. The water vapor and nitrogen pass overhead in reaction zone 9 through line 17. This gaseous mixture is passed through cooler 19 and into a separator 21 where the water is condensed and removed by means of line 23. The nitrogen is passed by means of line 25 through a drier 27 which may be of any conventional design wherein the moisture is removed from the nitrogen. The anhydrous nitrogen is removed from drier zone 27 by means of line 29 and recycled to the system as hereinafter described.

Anhydrous magnesium/ammonium chloride and excess ammonium chloride is withdrawn from the initial fluid bed or reaction zone 9 by means of line 31 and introduced into reaction zone 33. Reaction zone 33 contains a fluidized bed 35 of anhydrous magnesium chloride. This secondary fluidized bed is maintained at a temperature of 660° F. to 1020° F., preferably at a temperature of about 900° F. by means of a heater coil or equivalent means 37. The pressure maintained at the top of tertiary reaction zone 33 is substantially equivalent to the pressure maintained in the initial reaction zone. The fluidized bed of magnesium chloride is maintained by means of the recycled nitrogen which is passed through a heating zone 39 and then introduced into the lower end of zone 33 to function as a fluidizing medium. Under these conditions of mixing hot magnesium chloride with the double salt magnesium/ammonium chloride, the double salt decomposes, resulting in the production of anhydrous ammonium chloride which is withdrawn overhead from reaction zone 33 by means of line 5. The anhydrous ammonium chloride and nitrogen are then recycled to zone 3 to countercurrently contact the incoming feed solution of magnesium chloride as hereinbefore described.

Anhydrous magnesium chloride is withdrawn from the bottom of secondary fluid bed 33 by means of line 43 and further processed as described.

While the operation has been described utilizing nitrogen as an inert gas and as a fluidizing gas, it is to be understool that other inert gases such as methane, hexane, benzene, hydrogen, argon and the like may be employed.

What is claimed is:

1. Process for the removal of water of hydration from magnesium chloride which comprises preparing an aqueous solution of said magnesium chloride; introducing said aqueous solution of magnesium chloride into an initial reaction zone and countercurrently contacting the same in said initial reaction zone with a gaseous mixture comprising ammonium chloride and an inert gas under conditions to form a magnesium/ammonium chloride double salt; removing the inert gas overhead from said initial reaction zone and an aqueous solution of the double salt from the lower section of said initial reaction zone; introducing the inert gas into the lower section of a secondary reaction zone under conditions to fluidize anhydrous magnesium/ammonium chloride in said secondary reaction zone and to maintain a fluid bed therein; introducing the aqueous solution of said double salt from said initial reaction zone into said secondary reaction zone which is maintained under conditions to vaporize the water and which contains an excess of ammonium chloride; removing water vapor and the inert gas overhead from said secondary reaction zone and handling the same in the manner to condense and remove the water therefrom; removing anhydrous magnesium/ammonium chloride from the lower section of said secondary reaction zone and introducing the same into a tertiary reaction zone wherein a fluid bed of anhydrous magnesium chloride is maintained; maintaining said tertiary reaction zone under conditions to decompose the double salt to produce ammonium chloride which is removed overhead from said tertiary reaction zone and anhydrous magnesium chloride which is removed from the lower section of said tertiary reaction zone.

2. Process as defined by claim 1 wherein the ammonium chloride removed overhead from said tertiary reaction zone is recycled to said initial reaction zone and wherein the fluidizing medium utilized in said tertiary reaction zone is heated inert gas recycled from said secondary reaction zone after the removal of the water vapor therefrom.

3. Process as defined by claim 1 wherein said inert gas comprises nitrogen.

4. Process as defined by claim 1 wherein the temperature maintained in said initial reaction zone is in the range from about 160° F. to 260° F. and wherein the pressure is in the range from about 5 to 30 lbs. per square inch gauge.

5. Process as defined by claim 4 wherein the amount of ammonium chloride introduced into said initial reaction zone as compared to the magnesium chloride introduced into said reaction zone is in the range from 1.0 to 1.5 moles of ammonium chloride per mole of magnesium chloride.

6. Process as defined by claim 5 wherein the amount of magnesium/ammonium chloride present in the bed in said secondary reaction zone as compared to the amount of ammonium chloride present in said bed in said secondary reaction zone is in the range from about 80 to 100 weight percent of magnesium/ammonium chloride as compared to from about 20 to 0.2 weight percent of ammonium chloride.

7. Process as defined by claim 4 wherein the temperature maintained in said secondary reaction zone is in the range from about 375° F. to 480° F.

8. Process as defined by claim 7 wherein the temperature in said tertiary reaction zone is in the range from about 660° F. to about 1020° F.

References Cited
UNITED STATES PATENTS

| | | | |
|---|---|---|---|
| 1,473,966 | 11/1923 | Namari et al. | 23—91 X |
| 1,875,013 | 8/1932 | Kaselitz | 23—91 X |
| 3,181,930 | 5/1965 | Olsen | 23—91 |

OSCAR R. VERTIZ, *Primary Examiner.*

EDWARD STERN, *Examiner.*